ns
3,567,486
HEAT-SEALABLE FILM
Timothy Alan Remmington, Hertford, and Auguste Louis Lucien Palluel, Windsor, England, assignors to Imperial Chemical Industries Limited, London, England
No Drawing. Filed Mar. 6, 1967, Ser. No. 620,678
Claims priority, application Great Britain, Mar. 29, 1966, 13,859/66
Int. Cl. C09j 7/02
U.S. Cl. 117—47  7 Claims

ABSTRACT OF THE DISCLOSURE

An improved heat sealable film having at least one surface treated to improve its bonding properties and having adhesively bonded thereto a resin coating of a condensation product of a monoaldehyde with an interpolymer of acrylamide or methacrylamide condensed in the presence of alkanol. The interpolymer is a copolymer of acrylamide and methacrylamide and at least one monoethylenically unsaturated monomer. Suitably the monoaldehyde is formaldehyde and the monoethylenically unsaturated monomer is styrene.

---

This invention relates to the production of coated film, and to the film produced thereby, in particular to heat-seal coated polyolefine film.

In our British specification No. 932,652 we describe a method of heat-seal coating olefine polymer or copolymer films in which uncoated film is subjected to a specified treatment to improve the bonding properties of its surface, after which the film is coated with a solution of a thermosetting resin, the thermosetting resin being substantially insoluble in water and its solvent is evaporated off; the film is overcoated with an aqueous dispersion of a heat-seal coating which is then dried off on the film and heated to set the thermosetting resin so that it becomes adhesively bonded to the heat-seal coating and to the base film.

In the above method it is necessary, in order to obtain good adhesion of the heat seal coating, to heat the film to about 120° C. to cross-link the thermosetting resin. We have found that for some applications the adhesion obtained between the film and the heat-seal coating is not adequate.

It is an object of the present invention to overcome these difficulties.

Accordingly we provide a process for the production of heat-seal coated organic thermoplastic polymeric films in which uncoated film is subjected to a treatment as hereinafter described to improve the bonding properties of its surface and then coated on at least one surface with a resin comprising a composition obtained by condensing a monoaldehyde with an interpolymer of acrylamide or methacrylamide with at least one other unsaturated monomer in the presence of an alkanol containing from one to six carbon atoms such that said composition has at least some amino hydrogens replaced by —ROR' groups, said R and R' groups being alkylene and alkyl groups corresponding to those of the monoaldehyde and the alkanol respectively and the coated film is over-coated on its coated surface or surfaces with a heat-seal coating and heated to set the resin so that it becomes adhesively bonded to the heat-seal coating and to the base film.

Preferably at least one of the other unsaturated monomers copolymerised with the acrylamide or methacrylamide is monoethylenically unsaturated.

The production of such resins is described in British specification No. 826,652.

We also provide heat-seal coated film produced by the process of this invention.

Examples of monoethylenically unsaturated monomers which may be copolymerised with acrylamide or methacrylamide include acrylic acid and its esters, for example methyl acrylate, ethyl acrylate, butyl acrylate, 2-ethylhexyl acrylate, isobutyl acrylate, hexyl acrylates and octyl acrylates; methacrylic acid and its esters for example methyl methacrylate, ethyl methacrylate and butyl methacrylate. Other suitable monomers include acrylonitrile, styrene, monomethyl styrene, vinyl toluene, acidic materials such as maleic anhydride, vinyl ethers. The resin may also comprise a copolymer of acrylamide and methacrylamide optionally with one or more other unsaturated monomers. The acrylamide or methacrylamide may be copolymerised with one or more monomers which may be selected from the list given above. Although it is preferred that at least one of the monomers should be monoethylenically unsaturated, it is possible to use dienes such as butadiene or chloroprene as the comonomer. Furthermore a ter-copolymer derived from acrylamide and/or methacrylamide, another monoethylenically unsaturated monomer and a diene may be used.

The coating resin used in the process of this invention may be modified by blending with other suitable materials, for example the water resistance of the coated film may be improved if the resin is blended with a small amount of a melamine formaldehyde or a urea formaldehyde condensation resin. The processability may be improved if the resin is blended with a small amount of a polyol.

The monoaldehyde used in the process of the present invention is preferably formaldehyde, in solution in an alkanol containing from one to six carbon atoms, such as butanol; alternatively a formaldehyde yielding substance such as paraformaldehyde or trioxymethylene may be used. It is also possible to use other aldehydes such as acetaldehyde, butyraldehyde and furfural. It is preferred to use two equivalents of the aldehyde for each amide group present in the polymer although other amounts, generally in the range of 0.5 to 3.5 equivalents of the aldehyde for each amide group present may be used.

Our preferred resins comprise a copolymer containing up to 90% of styrene, up to 80% of an alkyl acrylate, up to 15% of methacrylic acid and 5% to 25% of acrylamide condensed with a solution of formaldehyde in n-butanol containing from 0.2 to 3 equivalents of formaldehyde for each amide group in the copolymer. Resins containing less than 5% by weight of acrylamide or methacrylamide will not set sufficiently to provide an adequate bond between the heat-seal coating and the base film, whereas resins containing more than 25% of acrylamide or methacrylamide tend to be brittle when set. A catalyst should be added to the composition to accelerate the cure of the resin. Suitable catalysts are acids such as maleic acid, oxalic acid or dilute mineral acids. Our preferred catalyst comprises up to 10% by weight of the copolymer of sulphuric acid.

The resin may be applied to the film as a dispersion or as a solution. Economically it would be preferable to apply the resin as a dispersion in water. Aqueous dispersion techniques have the added advantage that there is no odour present which is generally the case when an organic solvent is used. However, when using aqueous techniques the catalysts which accelerates the curing of the resin tends to coagulate the aqueous dispersion. To dry off the dispersant than with systems using an organic solvent or dispersant and these high temperatures will tend to cure the resin before the heat-seal coat is applied thus reducing the adhesion between the base film and the heat-seal coat. Thus, it is preferred to apply the resin from an organic solvent or dispersant. Examples of suitable organic solvents include alcohols, aromatic hydrocarbon solvents such as xylene or mixtures of such solvents as is appropriate.

A particularly useful resin is a 50% solids solution of copolymer resin containing 38.5 parts of styrene, 44 parts of ethyl acrylate, 2.5 parts of methacrylic acid and 15 parts of acrylamide which had been reacted with formaldehyde in n-butanol and is then diluted to a 20% solids resin solution with a 50:50 mixture of xylene and industrial methylated spirits (the parts are the proportions of the constituents by weight). Another useful composition is one in which the ethylacrylate may be replaced by 2-ethyl hexyl acrylate.

Our invention is applicable to films of any organic thermoplastic polymeric material, for example polymers and copolymers of alpha olefines such as ethylene, propylene, butene and 4-methyl pentene-1; linear polyesters such as polyethylene terephthalate and polyethylene - 1:2 - diphenoxyethane-4:4'-dicarboxylate and polymers and copolymers containing vinyl chloride.

The films coated by this invention may be unoriented or may be oriented in one or both directions in the plane of the film and if oriented in both directions the orientation may be equal in those directions or unequal, for example with the higher degree of orientation in a preferred direction (usually the longitudinal direction). The oriented films may be heat set either before or after the coating treatment.

The surface of the film should be subjected to treatment to improve the bonding properties of its surface: this treatment may be physical or chemical treatment which oxidizes the film surface. Examples of suitable chemical treatment are to treat the surface of the film with oxidising agents such as chromic acid in sulphuric acid, hot nitric acid or exposure of the surface to ozone. Alternatively the surface of the film may be subjected to exposure of the surface to corona discharge (such treatment is described in British specification No. 715,914); exposure of the surface to ionising radiation, or exposure of the surface to a flame for a sufficient time to cause superficial oxidation but not long enough to cause distortion of its surface. The preferred treatment, because of its effectiveness and simplicity, is the high voltage electric stress accompanied by corona discharge.

By a heat-seal coating polymer is meant any polymer or copolymer which can be heat-sealed on the film to which it is applied by standard heat-sealing equipment (see H. P. Zade "Heat Sealing and High Frequency Welding of Plastics," Temple Press, London, 1959).

Because they give hard coatings and good heat-seal strengths and are also resistant to moisture and have low gas permeability, our preferred heat-seal coatings are copolymers of vinylidene chloride with acrylonitrile. It is particularly preferred to use copolymers containing between 80% and 95% by weight of vinylidene chloride and up to 20% by weight acrylonitrile, these copolymers may contain other monomers such as acrylic acid, itaconic acid and methacrylic acid. The heat-seal coating may be applied to the film as a solution or a dispersion but the solvent or dispersant should not be such that it will dissolve the resin coating already on the film. For economic reasons application as a dispersion is preferred.

Other polymeric coatings which may be applied as dispersions are polyvinyl acetate, partially hydrolysed polyvinyl acetate, butadiene/acrylonitrile copolymers, butadiene/styrene copolymers, butadiene/methyl methacrylate copolymers, butadiene/methyl methacrylate/styrene copolymers, methyl methacrylate/methacrylic acid copolymers, copolyesters of terephthalic acid and another dicarboxylic acid with a glycol, e.g. those containing not more than 4.0 molecular proportions of combined terephthalic acid to one molecular proportion of combined sebacic acid; copolymers of vinylidene chloride and vinyl chloride, copolymers of vinyl acetate with vinyl chloride, copolymers of vinyl acetate with ethylene and copolymers of vinyl chloride with ethylene.

The heat-seal coating polymer may be obtained in aqueous dispersion by grinding and dispersing it in water using a suitable emulsifying agent. It is, however, preferred to prepare such dispersions by polymerising the monomeric constituents of the heat-seal coating polymer in aqueous emulsion using an emulsifying agent to keep the polymer formed in a dispersed state. It is preferred to use a cationic emulsifying agent since good antistatic properties are thereby conferred on the heat-seal coated film, although some anionic emulsifying agents also confer antistatic properties on the film and may thus be used in the preparation of the dispersion of the heat-seal coating polymer.

The heat-seal coating dispersion may contain additives other than cationic surface active agents, for instance, antioxidants, dyes, pigments, lubricants, anti-blocking agents and ultra violet light stabilisers. It is particularly useful to add slip agents. These fall into two classes (a) comminuted solids which are insoluble in the heat-seal coating for instance, starch, talc, zinc oxide, calcium carbonate, magnesium carbonate, diatomaceous earths such as "Superfloss," silica, kaolin, titanium dioxide, triferric tetroxide and other inorganic oxides, carbonates, silicates, aluminates, and alumino-silicates and finely dispersed polymers such as polypropylene and polyvinyl chloride, the particle size of the slip agent being normally in the range 0.1 to 20 microns, and preferably for best effect in the range 0.2 to 5 microns; (b) waxy additives such as the unsaturated fatty acid amides, saturated fatty acid amides such as palmitamide, stearamide, distearamide and alkylene distearamides such as methylene and ethylene distearamide; hydroxylated fatty acid amides such as hydroxy stearamide, hydrogenated castor oil, ester type waxes, ether waxes and other hard waxes.

It is found when using the above compositions that the desired degree of cross-linking of the resin can be obtained by heating the coated film to temperatures below 100° C. This is particularly useful in the production of coated film in which the base film is dimensionally unstable at temperatures approaching its softening point, e.g. biaxially-oriented polypropylene, which, is dimensionally unstable at temperatures as low as 120° C. if heated for any length of time. And if heated for a short time as in a heat-sealer on a conventional packaging machine we have found that biaxially-oriented polypropylene will not tolerate temperatures above 140° C.

The coated films produced according to the process of this invention exhibit exceptionally high adhesion of heat-seal coat to base film and the films may be readily heat-sealed to form a very strong bond. Thus, values of at least 275 gram/inch for the adhesion of the heat-seal coat and heat-seal strengths of at least 200 gram/inch may be obtained. Furthermore, the heat-seal strength obtained using the process of this invention is found to be virtually independent of thickness of the base film whereas with previously known processes the heat-seal strength has been found to deteriorate with increasing thickness of the base film.

EXAMPLE 1

A 50% solids resin comprising a copolymer of

|  | Parts |
|---|---|
| Styrene | 38.5 |
| Ethyl acrylate | 44 |
| Methacrylic acid | 2.5 |
| Acrylamide | 15 | which had been reacted with formaldehyde in n-butanol was diluted to a 20% solids resin with a 50:50 mixture of xylene and methylated spirits. The resin was catalysed with 3% sulphuric acid and coated on to biaxially oriented polypropylene film which had been heat set at 150° C. and subjected to a corona discharge treatment. Samples of the coated film were heated to various temperatures to cure the resin. This coated film was then overcoated with a heat-seal coat comprising an 88:12 vinylidene chloride:acrylonitrile copolymer to which had been added small quantities of materials modifying the coating so that it had suitable antistatic, antiblocking and slip properties. The adhesion of the coating was measured by applying a 1 inch wide strip of "Sellotape" evenly to the coated film, sufficient tape being folded back on itself to allow a firm grip between finger and thumb. Another piece of "Sellotape" was then applied to the back of the sample and in the equivalent position to that on the front. This was then left for a short time in order to obtain a good bond between the tape and the coating.

A ½ inch wide sample was then cut from the tape/film laminate. This sample was held firmly on a flat surface with one hand while the folded back portion of tape was rapidly jerked back to initiate rupture between the base film and the coating. The force to propagate coat delamination is then measured in a simple tensometer, the rate of pull being 4 inches per minute, and the result converted to grams per inch of the sample.

The heat-seal strength was measured by cutting out a piece of film approximately 30 cm. x 20 cm. and folding the piece along the centre parallel to the longer side with the side under investigation inwards. This folded sample was then placed with the folded edge between and parallel to the jaws and just beyond the line of seal of a "Sentinel Heat Sealer" the jaws of which had been previously adjusted to a temperature of 130° C. and giving a sealing pressure of 5 lb. inch$^{-2}$ and a dwell time of 2 seconds. The seal was made and the sample withdrawn.

Three 1 inch wide test pieces are then cut parallel to the short side of the folded sample and the peel strength of each measured in a simple tensometer. The means of these three peel strengths is quoted as the Heat Seal Strength.

The results obtained are set out in Table 1.

TABLE 1

| | Heat seal strength, gram/inch | adhesion, gram/inch |
|---|---|---|
| Curing temperature, ° C. | | |
| 65 | 235 | |
| 80 | 230 | 280 |
| 90 | 250 | 350 |
| 95 | 250 | 320 |

EXAMPLE 2

Polypropylene film was coated with the same resin and heat-seal coat as in Example 1 and the resin cured at 65° C. but the speed at which the film was coated was altered for different samples. The adhesion and the heat-seal strength of these samples were measured as in Example 1, and we set out the results in Table 2.

TABLE 2

| | Heat seal strength, gram/inch | adhesion, gram/inch |
|---|---|---|
| Speed of coating, ft./min.: | | |
| 250 | 245 | |
| 350 | 260 | 350 |
| 450 | 275 | 380 |

EXAMPLE 3

Film was coated under similar conditions to Example 1, varying the density of the resin coating solution, curing the resin at 95° C.

TABLE 3

| | Heat seal strength, gram/inch | adhesion, gram/inch |
|---|---|---|
| Density, gram/cc.: | | |
| 0.872 | 250 | 320 |
| 0.882 | 233 | 280 |
| 0.892 | 205 | 300 |

EXAMPLE 4

A 50% solids resin comprising a copolymer of

| | Parts by weight |
|---|---|
| Styrene | 63.5 |
| 2-ethyl-hexyl acrylate | 24 |
| Methacrylic acid | 2.5 |
| Acrylamide | 10 | which had been reacted with formaldehyde in n-butanol was diluted to a 20% solids resin with a 50:50 mixture of xylene and methylated spirits. The resin was catalysed with 3% by weight of sulphuric acid and coated to a thickness of about $10^{-5}$ inch onto a biaxially oriented film of propylene $7 \times 10^{-4}$ inch thick which had been heat set and subjected to corona discharge treatment, the coated film was dried off at 80° C. and over-coated with a top coat about $7 \times 10^{-5}$ inch thick of a heat-sealable copolymer comprising 88:12 vinylidene chloride:acrylonitrile and the top coat dried off at 110° C.

The coated film was found to have a heat-seal strength of 360 gram/inch at 130° C. and the adhesion of the heat-seal coat to the base film was 500 gram/inch as measured by the "Sellotape" test.

EXAMPLE 5

The process of Example 4 was repeated starting with a 50% solids resin comprising a copolymer of

| | Parts by weight |
|---|---|
| Styrene | 43.5 |
| Ethyl acrylate | 44 |
| Methacrylic acid | 2.5 |
| Acrylamide | 10 | which was condensed with formaldehyde, diluted and catalysed with 2% by weight of sulphuric acid and coated onto a biaxially oriented, heat-set, corona discharge treated $9.5 \times 10^{-4}$ inch thick film of a copolymer containing 94% by weight of propylene and 6% by weight of ethylene.

The heat-seal strength of the coated film at 130° C. was found to be 360 gram/inch and the adhesion between the heat-seal coat and the base film was 500 gram/inch.

EXAMPLE 6

The process of Example 4 was repeated using the same resin used in Example 1 and coated onto polypropylene film $8 \times 10^{-4}$ inch thick. The resin coated film was over-coated with a $7 \times 10^{-5}$ inch thick coating of a copolymer containing 91:9:2 vinylidene chloride:acrylonitrile:acrylic acid and the coated film dried at 110° C.

The heat-seal strength of the coated film was 210 gram/inch and the adhesion between the heat-seal coat and the base film was so good that the heat-seal coat could not readily be stripped from the base film by the "Sellotape" test.

EXAMPLE 7

Four parts by weight of the resin composition used in Example 1 were blended with 1 part by weight of a butylated melamine formaldehyde condensation resin. The blend was catalysed with 3% by weight of sulphuric acid diluted as in Example 4 and coated onto a biaxially oriented, heat set and corona discharge treated polypropylene film $8 \times 10^{-4}$ inch thick. The coating which was $10^{-5}$ inch thick was dried off at 90° C. and overcoated with a $7 \times 10^{-5}$ inch thick coating of an 88:12 vinylidene chloride:acrylonitrile copolymer which was dried at 110° C.

The coated film was found to have a heat-seal strength of 330 gram/inch at 130° C. and an adhesion of 375 gram/inch.

EXAMPLE 8

The process of Example 7 was repeated except blending 4 parts of the resin with 1 part of an epoxy resin (Epikote 1001).

The heat-seal coated film had a heat-seal strength of 225 gram/inch at 130° C. and an adhesion of 235 gram/inch. However, these values were retained when the coated film was subjected to conditions of high humidity to a greater extent than when film coated with compositions without epoxy resin were subjected to the same conditions.

EXAMPLE 9

A 50% solids resin comprising a copolymer of

| | Party by weight |
|---|---|
| Styrene | 25 |
| Acrylonitrile | 20 |
| Butyl acrylate | 42.5 |
| Methacrylic acid | 2.5 |
| Acrylamide | 10 | which had been reacted with formaldehyde in n-butanol was diluted to a 20% solids resin with a 50/50 mixture of xylene and methylated spirits. The resin was catalysed with 1% by weight of $H_2SO_4$ and coated onto biaxially oriented, heat-set and corona discharge treated polypropylene film and dried at 60° C. The film was overcoated with an 88:12 vinylidene chloride:acrylonitrile copolymer and dried at 110° C.

The heat-seal strength of the coated film was found to be 300 gram/inch and the adhesion of the heat-seal coat to the base film was 350 gram/inch.

EXAMPLE 10

An aqueous latex containing 20% solids of a copolymer of

| | Parts by weight |
|---|---|
| Styrene | 40 |
| Ethyl acrylate | 45 |
| Acrylamide | 15 | which had been reacted with formaldehyde in n-butanol was catalysed with 3% by weight of sulphuric acid and coated onto biaxially oriented, heat-set and corona discharge treated polypropylene film $8 \times 10^{-4}$ inch thick. The coating dried off at 110° C. was overcoated with a coating of an 88:12 vinylidene chloride:acrylonitrile copolymer and then dried again at 110° C.

The coated film was found to have a heat-seal strength of 345 gram/inch at 130° C., and the adhesion was 110 gram/inch.

We claim:

1. Heat-sealable coated organic thermoplastic polymeric film comprising a polyolefin base film at least one surface of which has been subjected to a treatment to improve its bonding properties and having adhesively bonded thereto on at least one of the said treated surfaces a heat-sealable coating, said bonding being accomplished by a resin coating consisting essentially of the condensation product of a monoaldehyde and an interpolymer of acrylamide or methacrylamide condensed in the presence of an alkanol having 1 to 6 carbon atoms, said interpolymer consisting of a copolymer of acrylamide or methacrylamide and at least one monoethylenically unsaturated monomer and said condensation product having 0.2 to 3 equivalents of said monoaldehyde for each amide group in the interpolymer such that said condensation product has at least some amino hydrogens replaced by —ROR' group, said R and R' groups being alkylene and alkyl group corresponding to those of the monoaldehyde and the alkanol respectively.

2. Heat-sealable coated film according to claim 1 in which the monoaldehyde comprises formaldehyde.

3. Heat-sealable coated film according to claim 1 in which at least one of the other monoethylenically unsaturated monomers comprises styrene.

4. Heat-sealable coated film according to claim 1 in which at least one of the other monoethylenically unsaturated monomers is an acrylate.

5. Heat-sealable coated film according to claim 4 in which the acrylate is ethyl acrylate.

6. Heat-sealable coated film according to claim 4 in which the acrylate is 2-ethyl-hexyl acrylate.

7. Heat-sealable coated film according to claim 1 in which the resin comprises a copolymer containing up to 90% by weight of styrene, up to 80% by weight of an alkyl acrylate, up to 15% by weight of methacrylic acid and from 5% to 25% by weight of acrylamide condensed with a solution of formaldehyde in n-butanol containing from 0.2 to 3 equivalents to formaldehyde for each amide group in the copolymer.

References Cited
UNITED STATES PATENTS

| 3,250,639 | 5/1966 | Stead | 117—122X |
| 3,394,029 | 7/1968 | MacArthur | 117—76X |

FOREIGN PATENTS

| 826,652 | 1/1960 | Great Britain. |

WILLIAM D. MARTIN, Primary Examiner

B. D. PIANALTO, Assistant Examiner

U.S. Cl. X.R.

117—76, 122, 138.8